C. K. WIGHTMAN.
SECTIONAL BOLT.
APPLICATION FILED SEPT. 18, 1916.
1,337,807.
Patented Apr. 20, 1920.
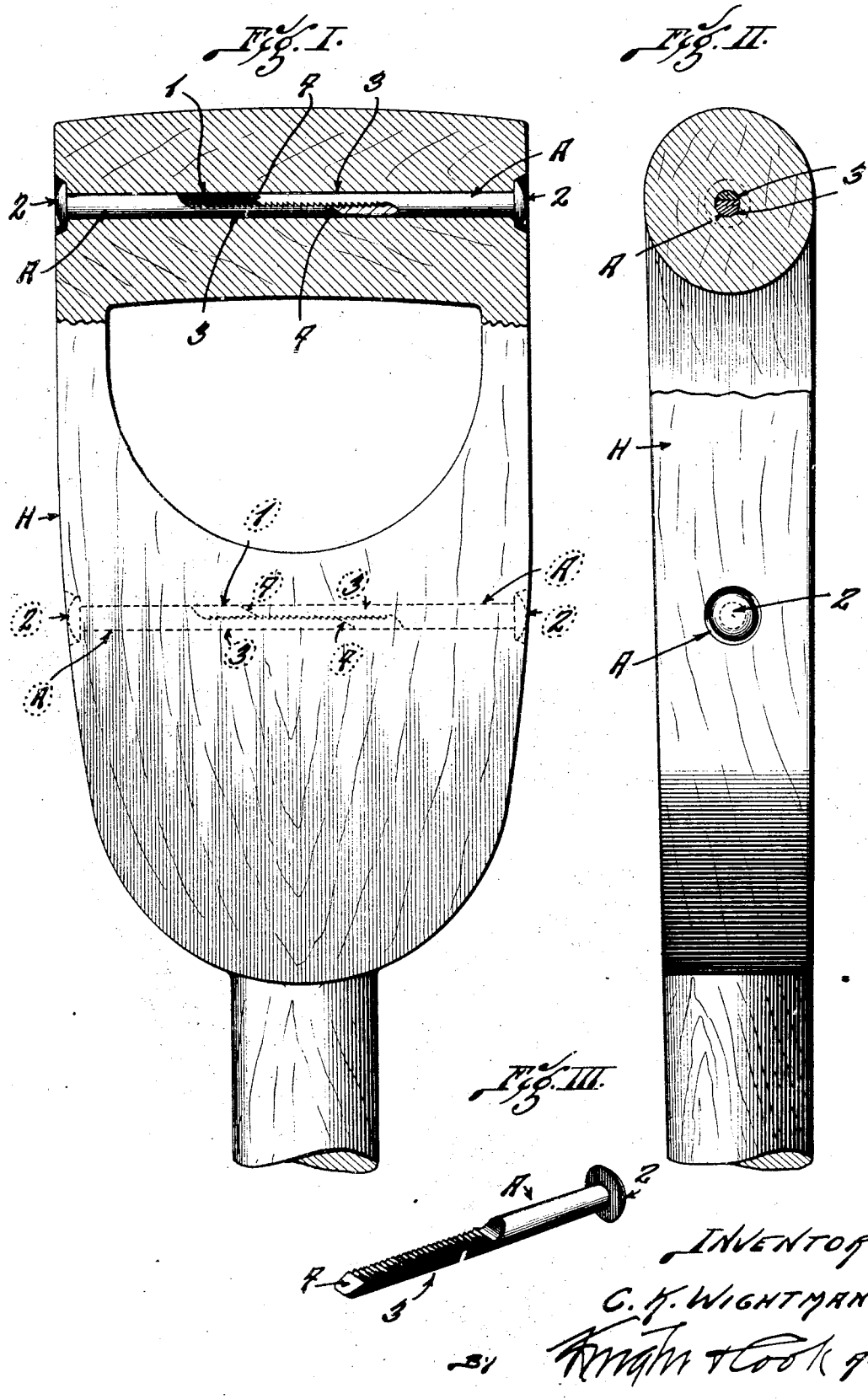

UNITED STATES PATENT OFFICE.

CHARLES K. WIGHTMAN, OF ALTON, ILLINOIS, ASSIGNOR TO BEALL BROTHERS, A CORPORATION OF ILLINOIS.

SECTIONAL BOLT.

1,337,807.  Specification of Letters Patent.  Patented Apr. 20, 1920.

Application filed September 18, 1916. Serial No. 120,708.

*To all whom it may concern:*

Be it known that I, CHARLES K. WIGHTMAN, a citizen of the United States of America, a resident of Alton, in the county of Madison, State of Illinois, have invented certain new and useful Improvements in Sectional Bolts, of which the following is a full, clear, and exact description, reference being had to the accompanying drawings, forming a part of this specification.

My invention relates to improvements in sectional bolts or rivets particularly adapted to reinforce wooden members, such as shovel handles, but it is to be understood that the new device may be used for other purposes.

Prior to this invention, rivets have been ordinarily used as reinforcing elements for shovel handles, and such reinforcing elements have not been entirely satisfactory. Considerable time and labor is required in upsetting a large number of rivets, and in actual practice it is found necessary to cut off and shorten many of the rivets before the upsetting operations. This is due to variations in the dimensions of the wooden shovel handles. The operator is usually provided with extra long rivets adapted to pass through the widest shovel handles, and to compensate for variations in the widths of the different handles it is usually necessary to shorten many of the rivets. Furthermore, the wooden handles will eventually shrink, thus loosening the rivets, reducing their value as reinforcing elements, and exposing the rivet heads at points where they are liable to cut the operator's hands and clothing.

The object of my invention is to provide a bolt or rivet adapted to be easily and quickly applied to a shovel handle, or other object, in such a manner that its heads will firmly engage their seats, without upsetting either end of the bolt or rivet. The new devices may be readily applied to shovel handles of various widths, and to compensate for the shrinkage of the wood, the user may very easily tighten the bolt or rivet by holding one of the heads and hammering the other head.

Figure I is a front elevation, partly in section, illustrating a shovel handle provided with two of the new devices.

Fig. II is a side elevation, partly in section, of the structure shown in Fig. I.

Fig. III is a perspective view of one of the bolt sections.

H designates a shovel handle provided with two openings 1 for the reception of the new devices, which I term sectional bolts. Each sectional bolt preferably comprises a pair of oppositely disposed sections A adapted to be inserted into opposite ends of a bolt-receiving opening, and adapted to interlock with each other, as shown most clearly in Fig. I. Each section A preferably has a head 2 at its outer end and a reduced extension 3 at its inner end provided with a row of transverse ratchet teeth. The reduced extension 3 of each section is adapted to slide along and interlock with the ratchet teeth of the other section. It will be noted that the interlocked ratchet teeth have inclined faces which allow the sections to move freely toward each other. The lapped portions of the sections A are closely fitted to each other and closely fitted to the wall of the bolt receiving opening, so as to retain the ratchet teeth in interlocking engagement with each other, thereby preventing the sections from moving away from each other. It is to be understood, however, that the sections may be readily hammered inwardly. Obviously, the sectional bolt may be easily applied to a shovel handle, or other object, and if it loosens on account of shrinkage of the wood, it may be easily tightened by placing one of the heads 2 against some firm object and then hammering the other head.

These advantages are due to the fact that the fine ratchet teeth are formed in a line parallel with the axis of the bolt instead of being formed in a line at an angle to said axis. The toothed portions are approximately semi-circular in cross-section at all points throughout their length, and they are combined with each other to provide a circular body which contacts with the circular wall of the bolt receiving opening. The end portion of each bolt section is circular in cross section, and this circular portion is preferably closely fitted to the wall of the bolt receiving opening. By making the sections in this manner they can be firmly mounted in the opening, and it is important to observe that they can be readily adjusted longitudinally so as to obtain all of the advantages previously pointed out, without materially tightening or loosening the sections in the bolt receiving opening.

To economize in the manufacture of the device, the sections A are preferably made exactly alike.

A wedge-like point 4 is formed at the inner end of each section A. When the sections are inserted into opposite ends of the bolt receiving opening, the wedge-like elements will engage each other and deflect the sections to insure the required interlocking engagement of the ratchet teeth. This is an advantage for the reason that the ends of the sections are concealed from the operator, and it would be difficult to turn these ends to predetermined relative positions in assembling the bolt. When the sections A are forced into engagement with each other, the wedge-like ends 4 will coöperate with each other to turn the sections to the desired relative positions.

I claim:—

An adjustable bolt adapted for use in connection with a shrinkable material comprising a pair of oppositely disposed lapping sections adapted to be inserted into opposite ends of a bolt-receiving opening, each of said sections having a head at its outer end and reduced extensions at its inner end, said heads contacting with the body of material surrounding the bolt-receiving hole and the said reduced extensions being so arranged as to permit the distance between said heads to be reduced when the width of the body surrounding the bolt hole is reduced, the reduced extensions being approximately semi-circular in cross section and combined with each other to produce a circular sectional body approximately equal in diameter to the body of the bolt, the contacting faces of said reduced sections being provided with ratchet teeth which interlock with each other to prevent the sections from moving away from each other, and said ratchet teeth being formed in a line parallel with the axis of the bolt and provided with inclined faces so as to allow the lapped sections to slide toward each other, each of said reduced sections being provided with a wedge-like end for the purpose described.

C. K. WIGHTMAN.